(12) United States Patent
Choi et al.

(10) Patent No.: US 10,158,516 B2
(45) Date of Patent: Dec. 18, 2018

(54) METHOD AND APPARATUS FOR TRANSMITTING DATA BLOCK

(71) Applicant: LG ELECTRONICS INC., Seoul (KR)

(72) Inventors: Jinsoo Choi, Seoul (KR); Jinyoung Chun, Seoul (KR); Wookbong Lee, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/303,202

(22) PCT Filed: Mar. 23, 2015

(86) PCT No.: PCT/KR2015/002845
§ 371 (c)(1),
(2) Date: Oct. 10, 2016

(87) PCT Pub. No.: WO2015/160102
PCT Pub. Date: Oct. 22, 2015

(65) Prior Publication Data
US 2017/0033960 A1    Feb. 2, 2017

Related U.S. Application Data

(60) Provisional application No. 61/979,520, filed on Apr. 15, 2014.

(51) Int. Cl.
*H04L 27/26* (2006.01)
*H04L 5/00* (2006.01)
*H04W 84/12* (2009.01)

(52) U.S. Cl.
CPC .......... *H04L 27/265* (2013.01); *H04L 5/0005* (2013.01); *H04L 5/005* (2013.01);
(Continued)

(58) Field of Classification Search
None
See application file for complete search history.

(56) References Cited

U.S. PATENT DOCUMENTS

2012/0134440 A1   5/2012  Yun et al.
2012/0269124 A1*  10/2012 Porat ................. H04W 72/1231
                                                          370/328
(Continued)

FOREIGN PATENT DOCUMENTS

EP    3131249    2/2017

OTHER PUBLICATIONS

Atheros, et al., "Wireless LANs", IEEE 802.11-10/1361r3, Jan. 18, 2011, 154 pages.
(Continued)

*Primary Examiner* — Christopher M Crutchfield
*Assistant Examiner* — Thinh D Tran
(74) *Attorney, Agent, or Firm* — Lee Hong Degerman Kang Waimey

(57) ABSTRACT

Provided are method for transmitting a data block in a wireless LAN and an apparatus using the same. A transmitter transmits a physical layer protocol data unit (PPDU) in a transmission bandwidth. The PPDU includes a first part to which a first fast Fourier transform (FFT) size is applied and a second part to which a second FFT size is applied. The second FFT size increases by integer times as the size of the transmission bandwidth increases.

4 Claims, 10 Drawing Sheets

(52) U.S. Cl.
CPC .......... *H04L 5/0044* (2013.01); *H04L 5/0048* (2013.01); *H04L 27/26* (2013.01); *H04L 27/2628* (2013.01); *H04W 84/12* (2013.01)

(56) References Cited

U.S. PATENT DOCUMENTS

| | | |
|---|---|---|
| 2013/0243115 A1 | 9/2013 | Taghavi Nasrabadi et al. |
| 2013/0266083 A1 | 10/2013 | Baik et al. |
| 2013/0266086 A1* | 10/2013 | Yang ................ H04L 5/0048 375/295 |
| 2013/0315163 A1 | 11/2013 | Zhang et al. |
| 2015/0139118 A1* | 5/2015 | Azizi ................ H04L 5/003 370/329 |
| 2017/0041050 A1* | 2/2017 | Choi ................ H04L 27/26 |

OTHER PUBLICATIONS

European Patent Office Application Serial No. 15780568.0, Search Report dated Oct. 26, 2017, 9 pages.

Azizi, S. et al., "OFDMA Numerology and Structure," doc.: IEEE 802.11-15/0330r1, XP068082961, Mar. 2015, 38 pages.

\* cited by examiner

METHOD AND APPARATUS FOR TRANSMITTING DATA BLOCK

CROSS-REFERENCE TO RELATED APPLICATIONS

This application is the National Stage filing under 35 U.S.C. 371 of International Application No. PCT/KR2015/002845, filed on Mar. 23, 2015, which claims the benefit of U.S. Provisional Application No. 61/979,520, filed on Apr. 15, 2014, the contents of which are all hereby incorporated by reference herein in their entirety.

BACKGROUND OF THE INVENTION

Field of the Invention

The present invention relates to wireless communication and, most particularly, to a method and apparatus for transmitting a data block in a wireless LAN.

Related Art

Wi-Fi refers to a WLAN (Wireless local area network) technology that allows a wireless device to be connected to the Internet in a 2.4 GHz, 5 GHz, or 60 GHz frequency band. WLAN is based on an IEEE (Institute of Electrical and Electronics Engineers) 802.11 standard (or specification).

The IEEE 802.11n specification supports multi-antenna and provides a maximum data rate of 600 Mbit/s. A system that supports IEEE 802.11n is referred to as a HT (High Throughput) system.

The IEEE 802.11ac specification mostly operates in a 5 GHz band and provides a data rate of 1 Gbit/s or more. IEEE 802.11ac supports DL MU-MIMO (downlink multi-user multiple input multiple output). And, a system supporting IEEE 802.11ac is referred to as a VHT (Very High Throughput) system.

IEEE 802.11ax is being developed as a next generation WLAN in order to prepare for a higher data rate and a higher user load. The scope of the IEEE 802.11ax may include 1) an enhancement of the 802.11 PHY (physical) layer and the MAC (medium access control) layer, 2) an enhancement in a spectrum efficiency and area throughput, and 3) an enhancement in the system performance in an environment having a source of interference existing therein, a dense heterogeneous network environment, an environment having a high user load existing therein, and so on.

The legacy IEEE 802.11 specification (or standard) supports OFDM (orthogonal frequency division multiplexing) and uses only one FFT (fast Fourier transform) size in the same bandwidth. However, the next generation WLAN considers supporting OFDMA (orthogonal frequency division multiple access), wherein multiple user access is available, and using a larger FFT size.

SUMMARY OF THE INVENTION

Technical Objects

The present invention provides a method for transmitting a data block and an apparatus using the same.

Technical Solutions

In an aspect, a method for transmitting a frame in a wireless LAN includes generating a PPDU (Physical layer Protocol Data Unit) by a transmitter, and transmitting the PPDU from a transmission bandwidth to a receiver by the transmitter. The PPDU includes a first part having a first FFT (fast Fourier transform) size applied thereto and a second part having a second FFT size applied thereto. The second FFT size is larger than the first FFT size. The second FFT size increases to its integer multiple in accordance with an increase in a bandwidth size, the number of pilots of the second part is incremented by the integer multiple, and pilot subcarrier spacing is maintained.

When a size of the transmission bandwidth is equal to 20N MHz (N>1), a number of pilots of the second part may correspond to a multiple of N of the number of pilots respective to the transmission bandwidth of 20 MHz.

In another aspect, an apparatus for a wireless LAN includes a RF (radio frequency) unit transmitting and receiving radio signals, and a processor being connected to the RF unit. The processor is configured to generate a PPDU (Physical layer Protocol Data Unit), and to transmit the PPDU from a transmission bandwidth to a receiver through the RF unit. The PPDU includes a first part having a first FFT (fast Fourier transform) size applied thereto and a second part having a second FFT size applied thereto. The second FFT size is larger than the first FFT size. The second FFT size increases to its integer multiple in accordance with an increase in a bandwidth size, the number of pilots of the second part is incremented by the integer multiple, and pilot subcarrier spacing is maintained.

Effects of the Invention

When different FFTs are applied within a data block, fair channel tracking may be carried out between multiple users.

DESCRIPTION OF EXEMPLARY EMBODIMENTS

In order to clarify the description, a WLAN (wireless local area network) system following the IEEE (Institute of Electrical and Electronics Engineers) 802.11n specification will be referred to as a HT (High Throughput) system, and a system following the IEEE 802.11ac specification will be referred to as a VHT (Very High Throughput) system. Conversely, a WLAN system following the proposed method will be referred to as a HEW (High Efficiency WLAN) system or a HE (High Efficiency) system. The term HEW or HE is used to merely differentiate the system from the conventional WLAN, and, therefore, such terms will not limit the present invention.

The proposed WLAN system may operate in a 6 GHz band or lower or in a 60 GHz band. And, herein, the band that is equal to or lower than 6 GHz may include at least one of the 2.4 GHz band and the 5 GHz band.

A STA (station) may also be referred to as diverse terms, such as wireless device, MS (mobile station), network interface device, wireless interface device, and so on. Unless the STA separately differentiates its functions with an AP (access point), the STA may include a non-AP STA or an AP. When the communication is referred to as a STA-to-AP communication, the STA may be interpreted as a non-AP STA. When the communication is referred to as a STA-to-STA communication, or if an AP function is not separately required, the STA may correspond to a non-AP STA or an AP.

A PPDU (Physical layer Protocol Data Unit) corresponds to a data block that is generated in a PHY (physical) layer following the IEEE 802.11 specification.

Figure 1:
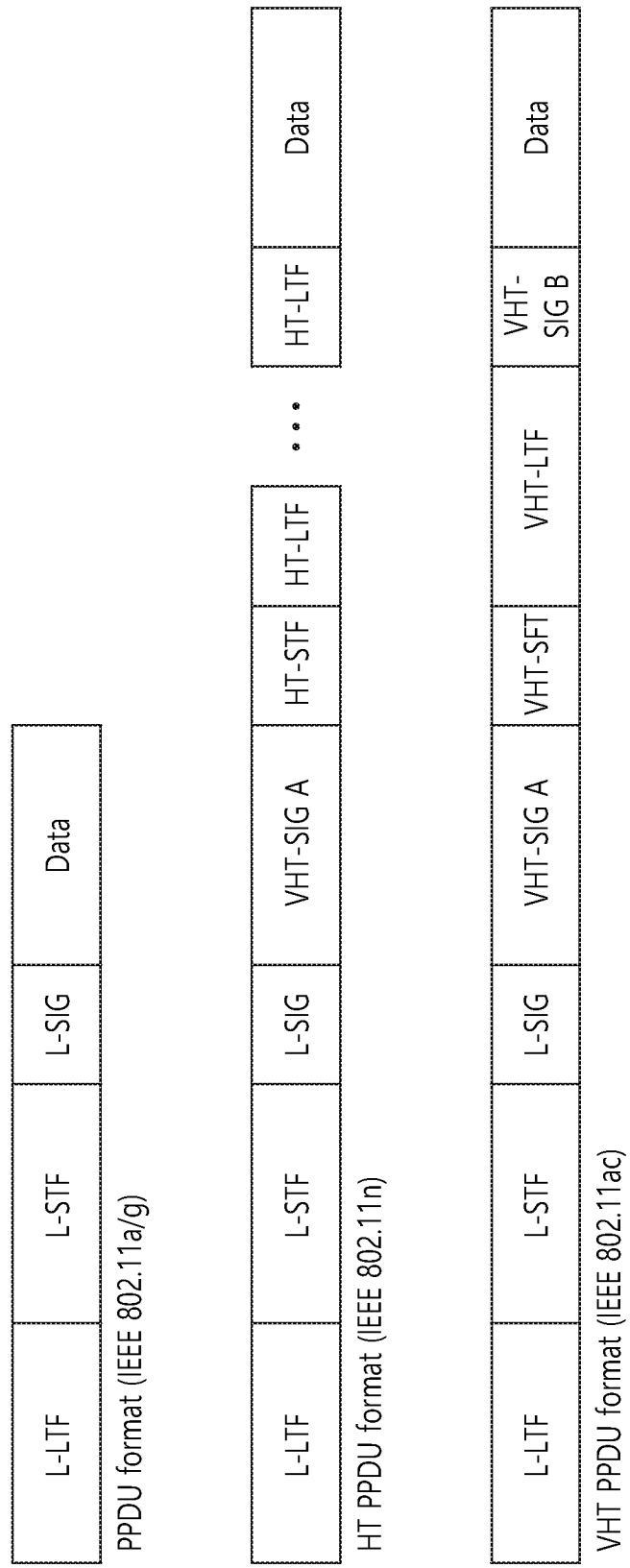
FIG. 1 illustrates a related art PPDU format.

FIG. 1 illustrates a related art PPDU format.

The PPDU supporting IEEE 802.11a/g includes a L-STF (legacy-short training field), a L-LTF (legacy-long training field), and a L-SIG (legacy-signal). The L-STF may be used for frame detection, AGC (automatic gain control), and so on. The L-LTF may be used for fine frequency/time synchronization and channel estimation.

The HT PPDU supporting IEEE 802.11n includes a HT-SIG, a HT-STF, and a HT-LTF after the L-SIG.

The VHT PPDU supporting IEEE 802.11ac includes a VHT-SIGA, a VHT-STF, a VHT-LTF, and a VHT-SIGB after the L-SIG.

Figure 2:
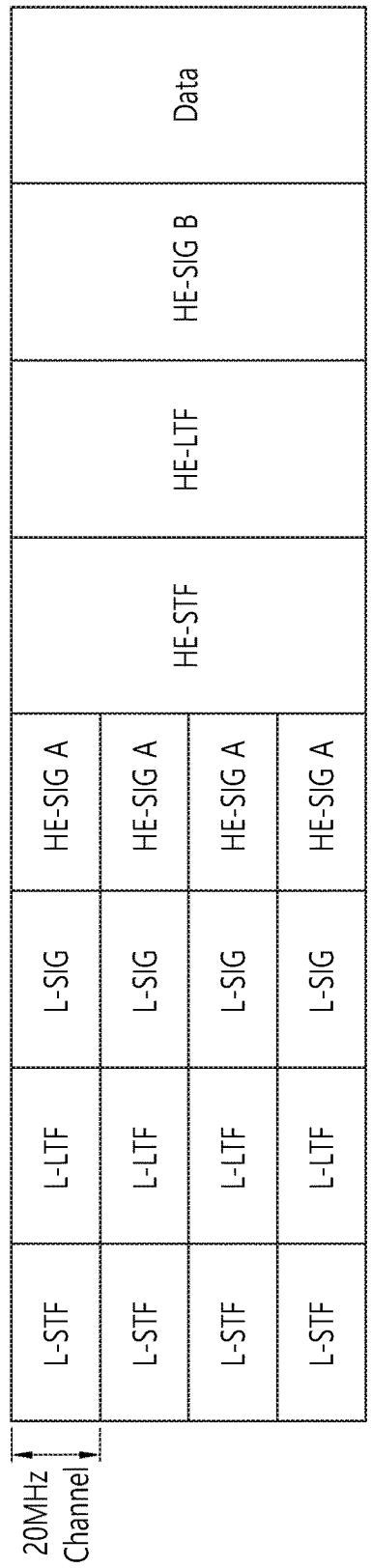
FIG. 2 illustrates an example of a proposed PPDU format for WLAN.

FIG. 2 illustrates an example of a proposed PPDU format for WLAN.

This shows a PPDU that is being transmitted from a total bandwidth of 80 MHz through four (4) 20 MHz channels. The PPDU may be transmitted through at least one 20 MHz channel. An example wherein an 80 MHz band is allocated to one receiving STA is shown herein. Each of the 20 MHz channels may be allocated to different receiving STAs.

The L-STF, the L-LTF, and the L-SIG may be identical to the L-STF, the L-LTF, and the L-SIG of the VHT PPDU. The L-STF, the L-LTF, and the L-SIG may be transmitted from an OFDM (orthogonal frequency division multiplexing) symbol, which is generated based on a size of 64 FFT (fast Fourier transform) (or 64 subcarriers), in each 20 MHz channel.

The HE-SIGA may include common control information, which is commonly received by the STA receiving the PPDU. The HE-SIGA may be transmitted from two (2) or three (3) OFDM symbols.

The following table shows an example of the information included in the HE-SIGA. The field names and the number of bits are merely exemplary, and, therefore, not all of the fields are required to be included.

TABLE 1

|  | Bits | Description |
| --- | --- | --- |
| Bandwidth | 2 | This indicates the bandwidth transmitting the PPDU. For example, 20 MHz, 40 MHz, 80 MHz, or 160 MHz. |
| Group ID | 6 | This indicates the STA or the STA group that is to receive the PPDU. |
| Stream Information | 12 | This indicates a number of spatial streams or positions of the spatial streams that are to be received by the STA. Or, this indicates a number of spatial streams or positions of the spatial streams that are to be received by each STA of the STA group. |
| UL (Uplink) Indication | 1 | This indicates whether the PPDU is for the AP (UPLINK) or for the STA (DOWNLINK). |
| MU Indication | 1 | This indicates whether the PPDU corresponds to a SU-MIMO PPDU or a MU-MIMO PPDU. |
| GI(Guard Interval) Indication | 1 | This indicates whether a Short GI or a Long GI is being used. |
| Allocation Information | 12 | Band or channel (sub-channel index or sub-band index) being allocated to each STA from the bandwidth transmitting the PPDU. |
| Transmission Power | 12 | Transmission power for each of the allocated channels |

The HE-STF may be used for enhancing the AGC estimation in the MIMO transmission. The HE-LTF may be used for estimating the MIMO channel.

The HE-SIGB may include user specific information that is required by each STA in order to receive its own data (i.e., PSDU (physical layer service data unit)). The HE-SIGB may be transmitted from one (1) symbol or two (2) symbols. For example, the HE-SIGB may include information related to the length of the corresponding PSDU, and information related to the MCS (Modulation and Coding Scheme) of the.

The L-STF, the L-LTF, the L-SIG, and the HE-SIGA may be duplicately transmitted in 20 MHz channel units. More specifically, when the PPDU is being transmitted through four (4) 20 MHz channels, the L-STF, the L-LTF, the L-STG, and the HE-SIGA may be duplicately transmitted from each 20 MHz channel.

Starting from the HE-STF (or after the HE-SIGA), the FFT size per unit frequency may be further increased. For example, 256 FFT may be used in a 20 MHz channel, 512 FFT may be used in a 40 MHz channel, and 1024 FFT may be used in an 80 MHz channel. If the FFT size is increased, the OFDM subcarrier spacing is reduced. And, accordingly, the number of OFDM subcarriers per unit frequency may be increased, whereas the OFDM symbol time may be increased. In order to increase efficiency, the GI length after the HE-STF may be set to have the same length as the GI length of the HE-SIGA.

Figure 3:
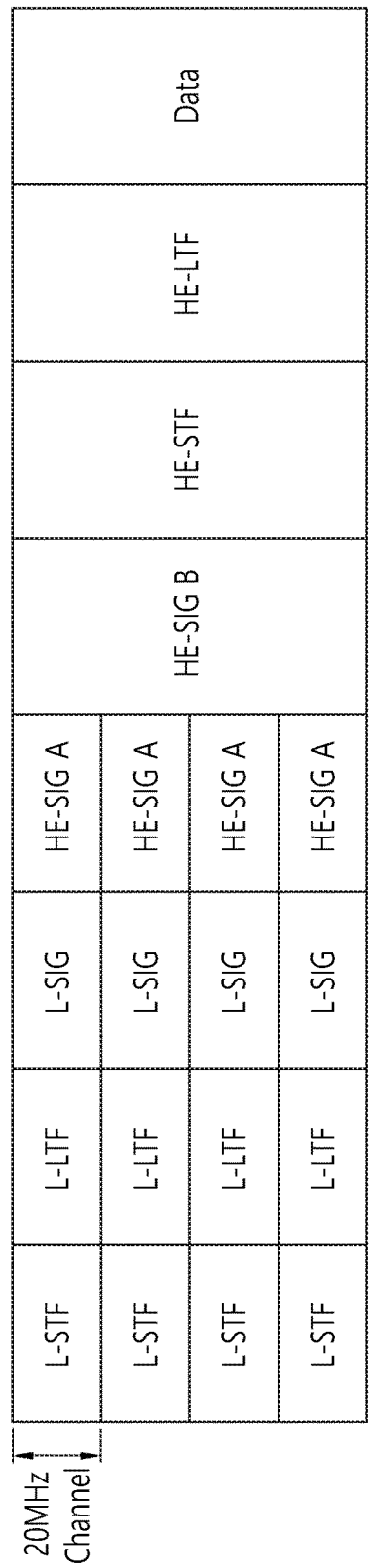
FIG. 3 illustrates another example of a proposed PPDU format for WLAN

FIG. 3 illustrates another example of a proposed PPDU format for WLAN

Apart from the fact that the HE-SIGB is positioned after the HE-SIGA, the PPDU format proposed herein is identical to the PPDU format of FIG. 2. Starting from the HE-STF (or after the HE-SIGB), the FFT size per unit frequency may be further increased.

Figure 4:
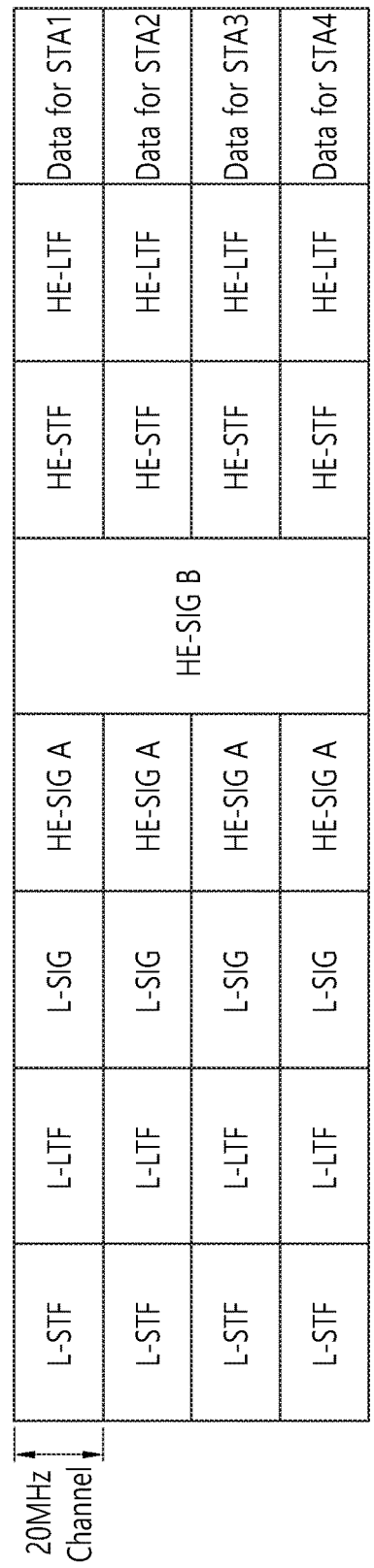
FIG. 4 illustrates yet another example of a proposed PPDU format for WLAN

FIG. 4 illustrates yet another example of a proposed PPDU format for WLAN

The HE-SIGB is positioned after the HE-SIGA. Each 20 MHz channel is allocated to a different STA (STA1, STA2, STA3, and STA4). Although the HE-SIGB includes information that is specified to each of the STAs, the HE-SIGB is encoded throughout the entire band. More specifically, HE-SIGB may be received by all of the STAs. Starting from the HE-STF (or after the HE-SIGB), the FFT size per unit frequency may be further increased.

Meanwhile, if the FFT size is increased, a legacy STA supporting the conventional IEEE 802.11a/g/n/ac cannot decode the corresponding PPDU. In order to allow the co-existence of the legacy STA and the HE STA, the L-STF, the L-LTF, and the L-SIG are transmitted through 64 FFT in the 20 MHz channel, so as to be received by the conventional STA. For example, the L-SIG occupies one OFDM symbol, and one OFDM symbol time corresponds to 4 us, and the GI corresponds to 0.8 us.

Although the HE-SIGA includes information that is required by the HE STA for decoding the HE PPDU, the HE-SIGA may be transmitted through 64 FFT in a 20 MHz channel, so that the HE-SIGA can be received by both the legacy STA and the HE STA. This is to allow the HE STA to receive not only the HE PPDU but also the conventional HTNHT PPDU. At this point, it will be required for the legacy STA and the HE STA to be capable of differentiating the HE PPDU and the HTNHT PPDU from one another.

Figure 5:
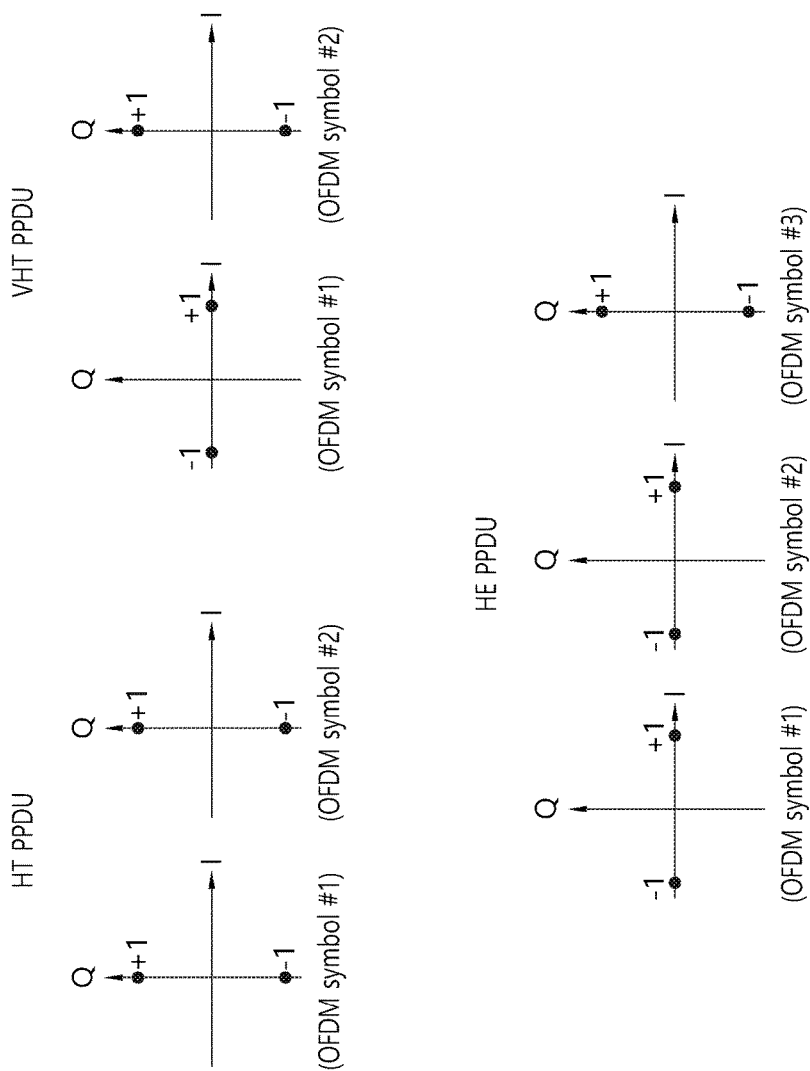
FIG. 5 illustrates an example of phase rotation for differentiating PPDUs.

FIG. 5 illustrates an example of phase rotation for differentiating PPDUs.

For the differentiation of the PPDU, a phase of the constellation respective to the OFDM symbols being transmitted after the L-STF, the L-LTF, and the L-SIG is used.

OFDM Symbol #1 corresponds to a first OFDM symbol after the L-SIG, OFDM Symbol #2 corresponds to an OFDM symbol subsequent to OFDM Symbol #1, and OFDM Symbol #3 corresponds to an OFDM symbol subsequent to OFDM Symbol #2.

In a non-HT PPDU, the constellation phases being used in the 1st OFDM symbol and the 2nd OFDM symbol are identical to one another. BPSK (binary phase shift keying) is used in both of the 1st OFDM symbol and the 2nd OFDM symbol.

In a HT PPDU, the constellation phased being used in OFDM Symbol #1 and OFDM Symbol #2 are identical to one another and are rotated by 90 degrees (90°) counter-clockwise. The modulation method having a constellation that is rotated by 90° is referred to as QBPSK (quadrature binary phase shift keying).

In a VHT PPDU, although the phase of OFDM Symbol #1 is not rotated, the phase of OFDM Symbol #2 is rotated by 90° counter-clockwise just as in the HT PPDU. The VHT-SIGA is transmitted after the L-SIG, and since the VHT-SIGA is transmitted from two (2) OFDM symbols, OFDM Symbol #1 and OFDM Symbol #2 are used for the transmission of the VHT-SIGA.

For the differentiation of the HTNHT PPDU, in the HE-PPDU, the phase of three (3) OFDM symbols that are being transmitted after the L-SIG may be used. Although the phases OFDM Symbol #1 and OFDM Symbol #2 are not rotated, the phase of OFDM Symbol #3 is rotated by 90° counter-clockwise. OFDM Symbols #1 and #2 use BPSK modulation, and OFDM Symbol #3 uses QBPSK modulation.

The HE-SIGA is transmitted after the L-SIG, and if the HE-SIGA is transmitted from three (3) OFDM symbols, it may be said that OFDM Symbols #1/#2/#3 are all used for the transmission of the HE-SIGA.

In the conventional VHT system, a pilot subcarrier is configured by using the method described below.

First of all, in the 20 MHz transmission, four (4) pilot tones may be inserted in subcarrier indexes $k \in \{-21, -7, 7, 21\}$. $P_n^k$, which indicates pilot mapping of a $k^{th}$ subcarrier in an $n^{th}$ symbol, may be expressed by using the Equation shown below.

$$P_n^{\{-21,-7,7,21\}} = \{\Psi_{1,n \bmod 4}^{(1)}, \Psi_{1,(n+1) \bmod 4}^{(1)}, \Psi_{1,(n+2) \bmod 4}^{(1)}, \Psi_{1,(n+3) \bmod 4}^{(1)}\}$$

$$P_n^{k \notin \{-21,-7,7,21\}} = 0 \quad \text{[Equation 1]}$$

Herein, a pilot parameter $\Psi^{(1)}_{1,m}$ in may be defined as shown below in the following table.

TABLE 2

| $\Psi_{1,0}^{(1)}$ | $\Psi_{1,1}^{(1)}$ | $\Psi_{1,2}^{(1)}$ | $\Psi_{1,3}^{(1)}$ |
|---|---|---|---|
| 1 | 1 | 1 | -1 |

In the 40 MHz transmission, six (6) pilot tones may be inserted in subcarrier indexes $k \in \{-53, -25, -11, 11, 25, 53\}$. $P_n^k$, which indicates pilot mapping of a $k^{th}$ subcarrier in an $n^{th}$ symbol, may be expressed by using the Equation shown below.

$$P_n^{\{-53,-25,-11,11,25,53\}} = \{\Psi_{1,n \bmod 6}^{(1)}, \Psi_{1,(n+1) \bmod 6}^{(1)}, \ldots, \Psi_{1,(n+5) \bmod 6}^{(1)}\}$$

$$P_n^{k \notin \{-53,-25,-11,11,25,53\}} = 0 \quad \text{[Equation 2]}$$

Herein, $\Psi^{(1)}_{1,m}$ may be defined as shown below in the following table.

TABLE 3

| $\Psi_{1,0}^{(1)}$ | $\Psi_{1,1}^{(1)}$ | $\Psi_{1,2}^{(1)}$ | $\Psi_{1,3}^{(1)}$ | $\Psi_{1,4}^{(1)}$ | $\Psi_{1,5}^{(1)}$ |
|---|---|---|---|---|---|
| 1 | 1 | 1 | -1 | -1 | 1 |

In the 80 MHz transmission, eight (8) pilot tones may be inserted in subcarrier indexes $k \in \{-103, -75, -39, -11, 11, 39, 75, 103\}$. $P_n^k$, which indicates pilot mapping of a $k^{th}$ subcarrier in an $n^{th}$ symbol, may be expressed by using the Equation shown below.

$$P_n^{\{-103,-75,-39,-11,11,39,75,103\}} = \{\Psi_{1,n \bmod 8}, \Psi_{1,(n+1) \bmod 8}, \ldots, \Psi_{1,(n+7) \bmod 8}\}$$

$$P_n^{k \notin \{-103,-75,-39,-11,11,39,75,103\}} = 0 \quad \text{[Equation 3]}$$

Herein, Tin may be defined as shown below in the following table.

TABLE 4

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | -1 | -1 | 1 | 1 | 1 |

For the 160 MHz transmission, the 80 MHz pilot mapping is duplicated to two (2) 80 MHz sub-channels for the 160 MHz transmission. Sixteen (16) pilot tones may be inserted in subcarrier indexes $k \in \{-231, -203, -167, -139, -117,$ −89, −53, −25, 25, 53, 89, 117, 139, 167, 203, 231}. $p_n^k$, which indicates pilot mapping of a $k^{th}$ subcarrier in an $n^{th}$ symbol, may be expressed by using the Equation shown below.

$$P_n^{\{-231,-203,-167,-139,-117,-89,-53,-25,25,53,89,117,139,167,203,231\}} = \text{[Equation 4]}$$

$$\{\Psi_{n \bmod 8}, \Psi_{(n+1) \bmod 8}, \Psi_{(n+2) \bmod 8}, \Psi_{(n+3) \bmod 8},$$
$$\Psi_{(n+4) \bmod 8}, \Psi_{(n+5) \bmod 8}, \Psi_{(n+6) \bmod 8}, \Psi_{(n+7) \bmod 8},$$
$$\Psi_{n \bmod 8}, \Psi_{(n+1) \bmod 8}, \Psi_{(n+2) \bmod 8}, \Psi_{(n+3) \bmod 8},$$
$$\Psi_{(n+4) \bmod 8}, \Psi_{(n+5) \bmod 8}, \Psi_{(n+6) \bmod 8}, \Psi_{(n+7) \bmod 8}\}$$

$$P_n^{k \notin \{-231,-203,-167,-139,-117,-89,-53,-25,25,53,89,117,139,167,203,231\}} = 0$$

The pilot parameter $\Psi_m$ for the 160 MHz transmission may be defined as shown in Table 4 just as in the 80 MHz transmission.

A pilot transmission method will hereinafter be described in detail.

The same FFT size is applied to the PPDU that is based on the conventional 802.11n and 802.11ac. For example, in the 20 MHz transmission, 64 FFT is applied.

However, as described above, in the HE PPDU, different FFT sizes may be applied to the PPDU. For example, the HE PPDU may be divided into two (2) parts, and a FFT size that can be received by a legacy STA may be applied to a first part, and a FFT size that can be received by a HE STA may be applied to a second part. The first part may also be referred to as a legacy part, and the second part may also be referred to as a HE part. In the HE PPDU structure shown in FIG. 2 to FIG. 4, the second part may be positioned after the L-SIG, after the HE-STF, or after the HE-SIGA.

Figure 6:
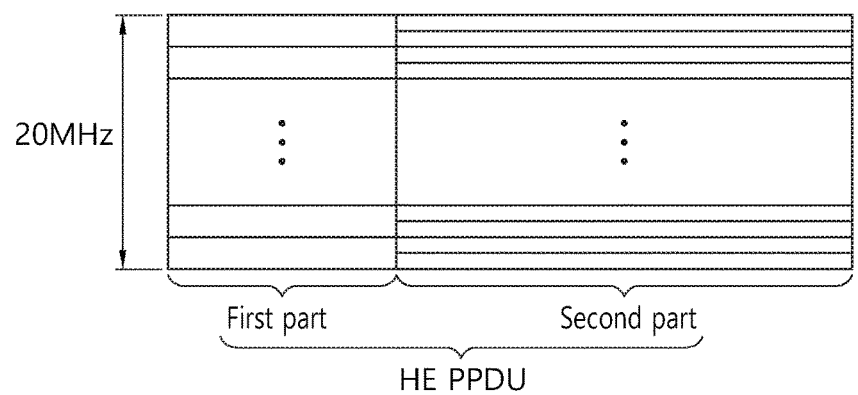
FIG. 6 illustrates an example of a HE PPDU having another FFT size applied thereto.

FIG. 6 illustrates an example of a HE PPDU having another FFT size applied thereto.

A FFT size having a size corresponding to an integer multiple of the size of the first part may be applied to the second part. For example, although 64 FFT is applied to the first part in the 20 MHz transmission, a FFT having a size that is 2 times larger (128 FFT) or 4 times larger (256 FFT) may be applied to the second part.

If the FFT size is increased (or expanded), the OFDM subcarrier spacing is reduced, thereby causing an increase in the number of OFDM subcarriers per unit frequency. When it is given that, in a 20 MHz transmission, 64 FFT is applied to the first part, and that 128 FFT is applied to the second part, the subcarrier spacing is equal to 312.5 kHz in the first part, and the subcarrier spacing is equal to 156.25 kHz in the second part. And, the CP size is increased from 0.8 us (micro second) to 1.6 us.

At this point, it may not be required to allocate a larger of number of pilots that are inserted in the PPDU, wherein the larger number of pilots is increased with respect to the increased FFT size. This is because, although a FFT having an increased size is applied herein, the bandwidth that is used for channel estimation and tracking is the same for both the first part and the second part. Additionally, if the design is realized while maintaining the pilot allocation according to the conventional system as much as possible, the issue of complexity caused by the adoption of a new system may not act as a significant burden.

Hereinafter, pilot allocation to the second part in 20 MHz, 40 MHz, 80 MHz, and 160 MHz bandwidths will be proposed.

It will be assumed that the first part and the second part within the HE PPDU are transmitted by using the same bandwidth. According to an exemplary embodiment of the present invention, a number of pilots in the second part may be increased in accordance with an increase in the size of the bandwidth. According to an exemplary embodiment of the present invention, the pilot frequency position of the second part within the same bandwidth may be maintained to the same position even if the FFT size increases.

Hereinafter, a number of tones being allocated to a DC subcarrier and a number of unused (or reserved) tones for interference prevention (e.g., 3 tones on one side and 4 tones on the other side in the 20 MHz transmission) are merely exemplary, and, therefore, arbitrary values may be assigned herein.

Figure 7:
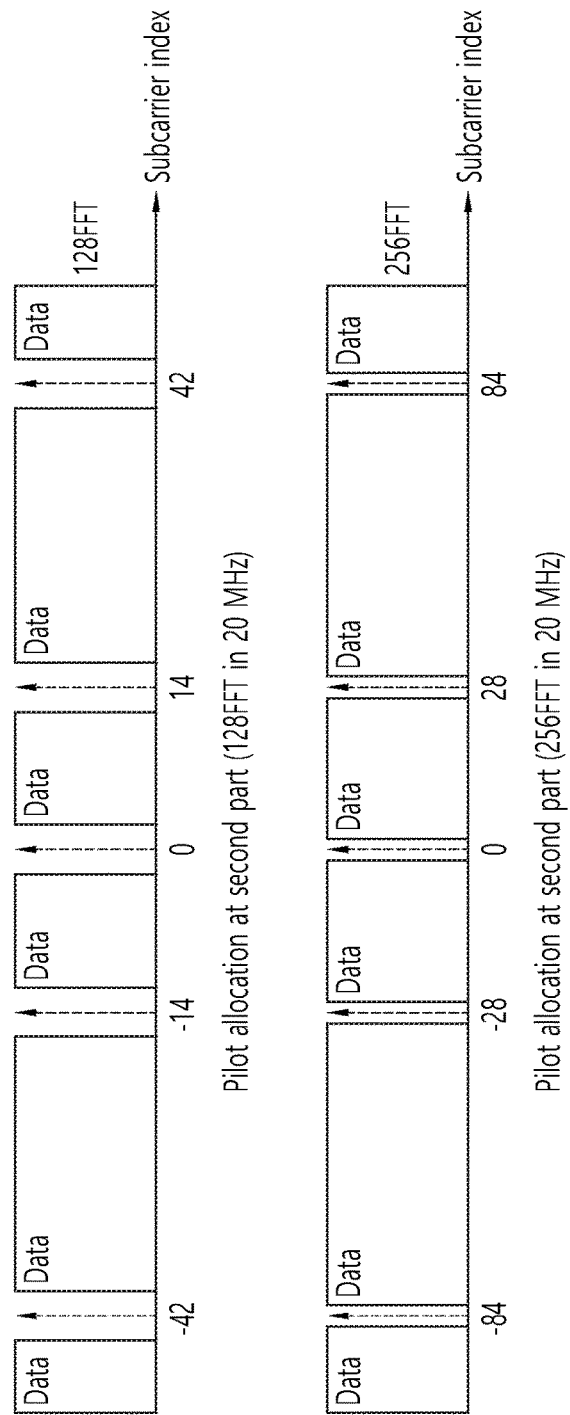
FIG. 7 illustrates pilot allocation in a second part during a 20 MHz transmission according to an exemplary embodiment of the present invention.

FIG. 7 illustrates pilot allocation in a second part during a 20 MHz transmission according to an exemplary embodiment of the present invention.

Just as in the conventional 20 MHz transmission, pilot allocation of Equation 1 is used for 64 FFT in the first part. Four (4) pilot tones may be inserted in the subcarrier index $k \in \{\pm 7, \pm 21\}$.

When it is given that 128 FFT is used for the second part, the pilot subcarrier index is equal to $k \in \{\pm 14, \pm 42\}$.

When it is given that 256 FFT is used for the second part, the pilot subcarrier index is equal to $k \in \{\pm 28, \pm 84\}$. Since 512 FFT is 2 times the size of 128 FFT, it may be given that the scaling factor corresponds to F=2, and that the pilot subcarrier index is equal to $F^*\{\pm 14, \pm 42\} = \{\pm 28, \pm 84\}$.

More specifically, as the FFT size being applied to the second part increases, the subcarrier index also increases accordingly. Even though the FFT size increases, the frequency position remains the same (or unchanged).

Figure 8:
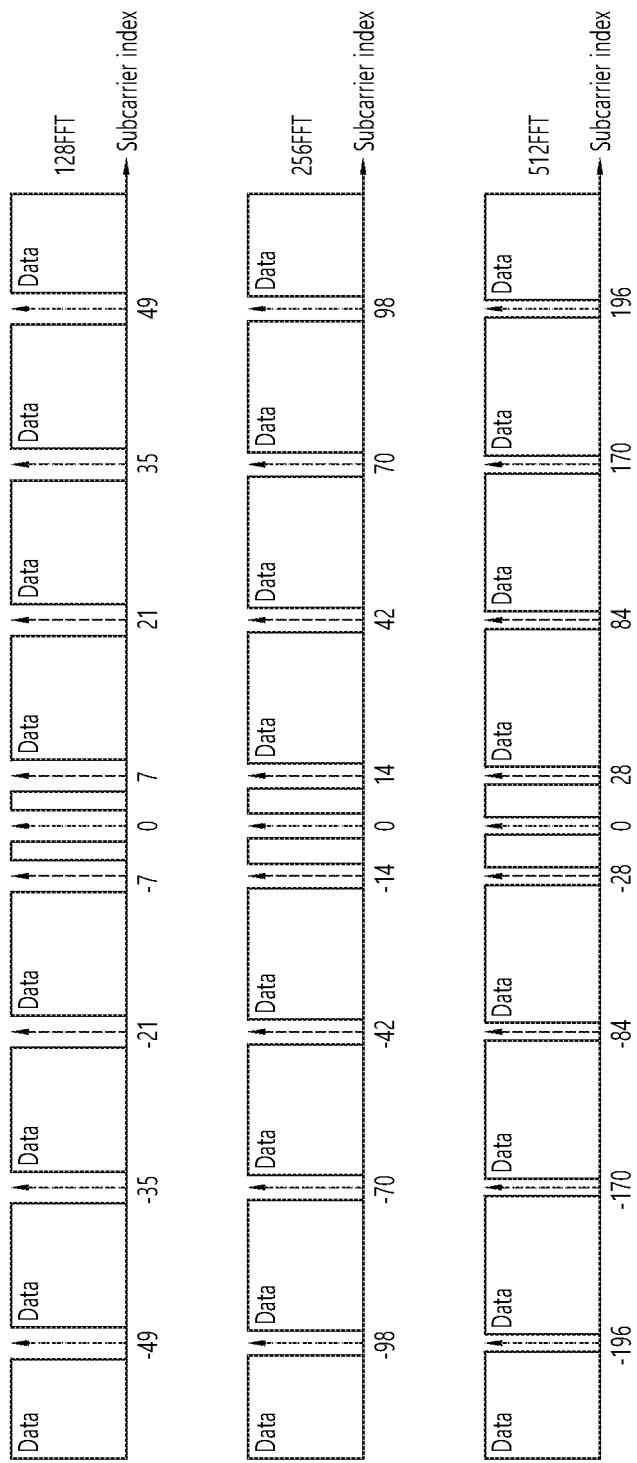
FIG. 8 illustrates pilot allocation in a second part during a 40 MHz transmission according to another exemplary embodiment of the present invention.

FIG. 8 illustrates pilot allocation in a second part during a 40 MHz transmission according to another exemplary embodiment of the present invention. This drawing shows the pilot allocations respective to when 128 FFT, 256 FFT, and 512 FFT are applied to the second part.

Just as in the conventional 40 MHz transmission, pilot allocation of Equation 2 is used for 128 FFT in the first part. Six (6) pilot tones may be inserted in the subcarrier index $k \in \{-53, -25, -11, 11, 25, 53\}$.

The pilot allocation in the second part respective to the FFT size may be as described below.

1) When using 128 FFT of 40 MHz, the pilot frequency index may be equal to $k \in \{\pm 7, \pm 21, \pm 35, \pm 49\}$.

2) When using 256 FFT of 40 MHz, the scaling factor may correspond to F=2, and the pilot frequency index may be equal to $k \in \{\pm 14, \pm 42, \pm 70, \pm 98\}$.

3) When using 512 FFT of 40 MHz, the scaling factor may correspond to F=4, and the pilot frequency index may be equal to $k \in \{\pm 28, \pm 84, \pm 140, \pm 196\}$.

Even if a larger FFT size is being applied in the same bandwidth, the number of pilot tones is maintained to 8 pilot tones (4 positive frequency indexes and 4 negative frequency indexes).

According to the proposed exemplary embodiment, the pilot allocation ratio per STA is maintained in the OFDMA. For example, it will be assumed that subchannels (or subbands) are being allocated for each STA in 20 MHz units. By equally maintaining the pilot allocation ratio in 20 MHz units, a fair channel tracking performance may be ensured. More specifically, when data fields respective to multiple STAs are included in one PPDU, the corresponding STA may receive data through a subchannel having the same number of pilot tones and the same pilot allocation structure.

In the 80 MHz bandwidth, 256 FFT is applied to the first part. When 256 FFT, 512 FFT (scaling factor F=2), and 1024 FFT (scaling factor F=4) are respectively applied to the second part, the pilot allocation is as described below.

1) When using 256 FFT of 80 MHz, the pilot frequency index may be equal to k∈{±7, ±21, ±35, ±49, ±63, ±77, ±91, ±105}.

2) When using 512 FFT of 80 MHz, the pilot frequency index may be equal to k∈{±14, ±42, ±70, ±98, ±126, ±154, ±182, ±210}.

3) When using 1024 FFT of 80 MHz, the pilot frequency index may be equal to k∈{±28, ±84, ±140, ±196, ±252, ±308, ±364, ±420}.

Even if a larger FFT size is being applied in the same bandwidth, the number of pilot tones is maintained to 16 pilot tones (8 positive frequency indexes and 8 negative frequency indexes).

In the 160 MHz bandwidth, when 512 FFT, 1024 FFT (scaling factor F=2), and 2048 FFT (scaling factor F=4) are respectively applied, the pilot allocation is as described below.

1) When using 512 FFT of 160 MHz, the pilot frequency index may be equal to k∈{±7, ±21, ±35, ±49, ±63, ±77, ±91, ±105, ±119, ±133, ±147, ±161, ±175, ±189, ±203, ±217}.

2) When using 1024 FFT of 160 MHz, the pilot frequency index may be equal to k∈{±14, ±42, ±70, ±98, ±126, ±154, ±182, ±210, ±238, ±266, ±294, ±322, ±350, ±378, ±406, ±434}.

3) When using 2048 FFT of 160 MHz, the pilot frequency index may be equal to k∈{±28, ±84, ±140, ±196, ±252, ±308, ±364, ±420, ±476, ±532, ±588, ±644, ±700, ±756, ±812, ±868}.

Even if a larger FFT size is being applied in the same bandwidth, the number of pilot tones is maintained to 32 pilot tones (16 positive frequency indexes and 16 negative frequency indexes).

According to another exemplary embodiment, when the FFT size increases in a specific bandwidth, the pilot allocation that is used in the conventional wide bandwidth may be used. For example, it will be assumed that the FFT size is increased to 2 times and that, therefore, the 128 FFT is applied in the 20 MHz transmission. The pilot allocation that is used in the 40 MHz transmission may be used in the 20 MHz transmission having 128 FFT. Alternatively, it will be assumed that the FFT size is increased to 4 times and that, therefore, the 256 FFT is applied in the 20 MHz transmission. The pilot allocation that is used in the 80 MHz transmission may be used in the 20 MHz transmission having 256 FFT.

According to yet another exemplary embodiment, when an increased FFT size is applied to a given bandwidth, if the number of guard subcarriers (also referred to as unused (or reserved) subcarriers) on both ends of the frequency is maintained without modification, subcarrier tones that are available for usage may be additionally gained through the data subcarrier. At this point, the pilot allocation according to the above-described method respective to the entire subcarrier index including the additional subcarrier tone may be applied. Alternatively, the proposed pilot allocation may be applied without modification in accordance with the FFT size, and a pilot subcarrier may be further allocated to each end of the respective additional subcarrier. This is advantageous in that the conventional subcarrier index may be maintained, while additional pilot tones may be further included.

Figure 9:
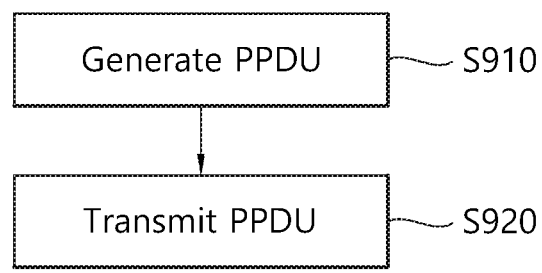
FIG. 9 illustrates a method for transmitting a PPDU according to an exemplary embodiment of the present invention.

FIG. 9 illustrates a method for transmitting a PPDU according to an exemplary embodiment of the present invention. This method may be performed by a transmitter (STA or AP).

In step S910, the transmitter generates a PPDU. And, in step S920, the transmitter transmits the PPDU to a receiver in the transmission bandwidth. The transmission bandwidth may correspond to an integer multiple of 20 MHz.

Although the PPDU may correspond to any one of the PPDU formats of FIG. 2 to FIG. 4, the present invention will not be limited only to this. The PPDU may include a first part to which a first FFT size is applied and a second part to which a second FFT size is applied.

As the size of the FFT size being applied to the second part increases, the subcarrier index also increases. The pilot subcarrier index may be decided in accordance with a scaling factor of the FFT size being applied to the second part. Even if the FFT size increases, the number of pilot subcarriers remains the same, and the frequency position also remains unchanged (or the same).

When the transmission bandwidth corresponds to 20 MHz, 40 MHz, 80 MHz, or 160 MHz, the pilot allocation in the second part may be carried out in accordance with the above-described exemplary embodiments.

Figure 10:
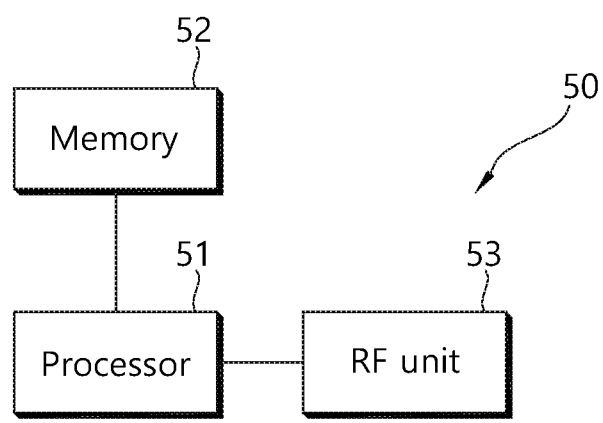
FIG. 10 illustrates a block diagram showing a wireless communication system in which the disclosure of this specification is implemented.

FIG. 10 illustrates a block diagram showing a wireless communication system in which the disclosure of this specification is implemented.

A wireless device 50 may include a STA in the above-described exemplary embodiment. The wireless device 50 may include a transmitter in the exemplary embodiment of FIG. 9.

The wireless device 50 includes a processor 51, a memory 52, and a RF unit (radio frequency unit) 53. In the above-described exemplary embodiment, the wireless device may correspond to an AP or a non-AP STA. The RF unit 53 is connected to the processor 51, thereby being capable of transmitting and/or receiving radio signals. The processor 51 realizes the proposed function, process, and/or method. In the above-described exemplary embodiment, the operations of the STA or transmitter may be realized by the processor 51. The memory 52 is connected to the processor 51, thereby being capable of storing the instructions that realize the operations of the processor 51.

The processor may include an ASIC (application-specific integrated circuit), another chip set, a logical circuit, and/or a data processing device. The memory may include a ROM (read-only memory), a RAM (random access memory), a flash memory, a memory card, a storage medium, and/or another storage device. The RF unit may include a baseband circuit for processing the radio signals. When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

In the exemplary system that is described above, although the methods are described based on a flow chart according to a series of steps or blocks, the present invention will not be limited only to the order of the process steps described herein, and, therefore, a particular step may be performed in an order that is different from the above-described order or may be performed simultaneously with another process step. Furthermore, it will be apparent to any one skilled in the art that the process steps mentioned in the flow chart presented herein are not exclusive, and that one or more of the process steps mentioned in the flow chart presented herein may be deleted without influencing or departing from the scope and spirit of the present invention.

What is claimed is:

1. A method for transmitting a frame in a wireless LAN, the method comprising:
   generating a physical layer protocol data unit (PPDU) by a transmitter; and
   transmitting the PPDU on a transmission bandwidth by the transmitter,
   wherein the transmission bandwidth is 80 MHz,
   wherein the PPDU includes a first part to which a first fast Fourier transmit (FFT) size is applied and a second part to which a second FFT size is applied,
   wherein the second FFT size is 512 and the first FFT size is 256,
   wherein frequency indexes of pilots in the first part are set to {±7, ±21, ±35, ±49, ±63, ±77, ±91, ±105} and each frequency index in the first part is defined in a unit of subcarrier spacing of 312.5 kHz, and
   wherein frequency indexes of pilots in the second part are set to {±14, ±42, ±70, ±98, ±126, ±154, ±182, ±210} and each frequency index in the second part is defined in a unit of subcarrier spacing of 156.25 kHz.

2. The method of claim 1, wherein the PPDU includes a plurality of data fields for corresponding receiving stations, 20 MHz sub-channel is allocated for each receiving station, and each data field has a same number of pilot tones and a same pilot allocation structure.

3. An apparatus for a wireless LAN, comprising:
   a radio frequency (RF) unit comprising a baseband circuit for processing a radio signal to be transmitted; and
   a processor being connected to the RF unit,
   wherein the processor is configured:
     to generate a physical layer protocol data unit (PPDU), and
     to transmit the PPDU on a transmission bandwidth through the RF unit,
   wherein the transmission bandwidth is 80 MHz,
   wherein the PPDU includes a first part to which a first fast Fourier transform size is applied and a second part to which a second FFT size is applied,
   wherein the second FFT size is 512 and the first FFT size is 256,
   wherein frequency indexes of pilots in the first part are set to {±7, ±21, ±35, ±49, ±63, ±77, ±91, ±105} and each frequency index in the first part is defined in a unit of subcarrier spacing of 312.5 kHz, and
   wherein frequency indexes of pilots in the second part are set to {±14, ±42, ±70, ±98, ±126, ±154, ±182, ±210} and each frequency index in the second part is defined in a unit of subcarrier spacing of 156.25 kHz.

4. The apparatus of claim 3, wherein the PPDU includes a plurality of data fields for corresponding receiving stations, 20 MHz sub-channel is allocated for each receiving station, and each data field has a same number of pilot tones and a same pilot allocation structure.

* * * * *